United States Patent [19]

Swanner

[11] Patent Number: 5,092,623
[45] Date of Patent: Mar. 3, 1992

[54] HEAVY DUTY EASY LOADING TRAILER

[76] Inventor: Melvin B. Swanner, P.O. Box 1047, Howe, Tex. 75059

[21] Appl. No.: 566,849

[22] Filed: Aug. 10, 1990

Related U.S. Application Data

[63] Continuation of Ser. No. 271,868, Nov. 16, 1988, abandoned.

[51] Int. Cl.$^5$ .................. B60P 1/04; B60P 1/28; B62D 21/14
[52] U.S. Cl. .................. 280/638; 280/656; 280/686; 280/789; 414/477; 414/480; 414/484
[58] Field of Search .............. 280/638, 656, 686, 789; 414/477, 478, 480, 484, 485

[56] References Cited

U.S. PATENT DOCUMENTS

| | | | |
|---|---|---|---|
| 2,452,681 | 11/1948 | Rehberger | 414/484 |
| 2,468,502 | 4/1949 | Lisota | 414/477 |
| 2,703,658 | 3/1955 | Bazzell | 414/480 |
| 2,753,064 | 7/1956 | Lesser | 414/475 |
| 2,803,362 | 8/1957 | Saenz | 414/480 |
| 2,808,953 | 10/1957 | Whitney | 414/477 |
| 2,821,315 | 1/1958 | Bucher | 414/477 |
| 2,859,889 | 11/1958 | Love | 414/475 |
| 3,335,887 | 8/1967 | Snook | 414/476 |
| 3,472,406 | 10/1969 | Slipp | 414/475 |
| 3,497,232 | 2/1970 | Richey | 414/477 |
| 3,690,490 | 9/1972 | Hall | 414/485 |
| 4,083,573 | 4/1978 | Baxter | 414/484 |
| 4,109,811 | 8/1978 | Stucky | 280/638 X |
| 4,806,061 | 2/1989 | Fenton | 414/475 |

FOREIGN PATENT DOCUMENTS 559509  2/1944  United Kingdom ............... 414/480

*Primary Examiner*—Mitchell J. Hill
*Attorney, Agent, or Firm*—Ross, Howison, Clapp & Korn

[57] ABSTRACT

A trailer is provided having a frame (2) upon which a bed (b 3) slides. The frame (2) has a wheel and axle assembly (1) and (5) disposed thereon which is connected thereto by a spring hanger assembly (6). The spring hanger assembly (6) is comprised of a spring and axle assembly (17). A tongue and coupling (7) is provided for connecting one end of the bed (3) to a vehicle. The bed (3) slides relative to the frame (2) when the wheels (5) are locked and the tongue assembly (7) pushed rearward. The bed (9) tilts when the rearmost portion moves the center of gravity away from the wheels (5). The end of the bed (3) will contact the ground, allowing loading on the surface thereof.

4 Claims, 4 Drawing Sheets

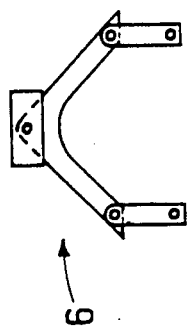
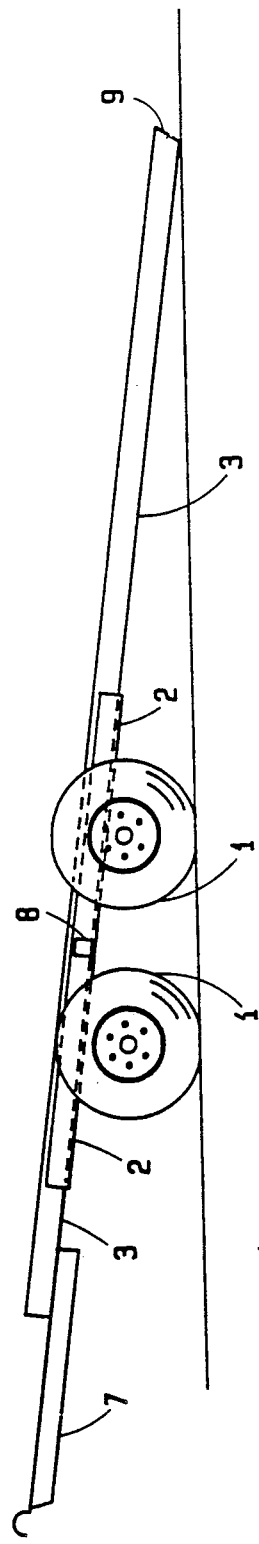
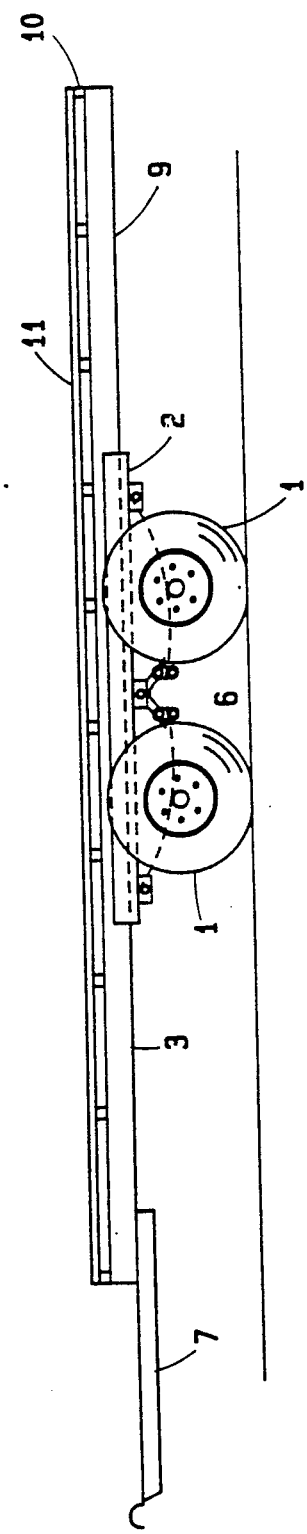
FIG. 5
FIG. 4
FIG. 3

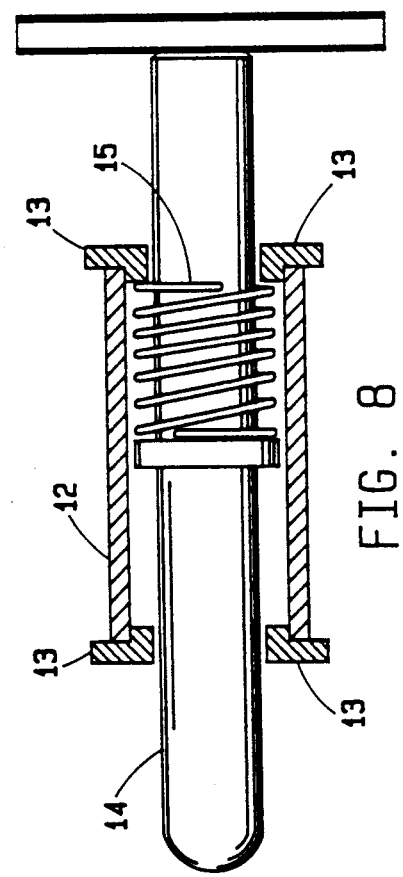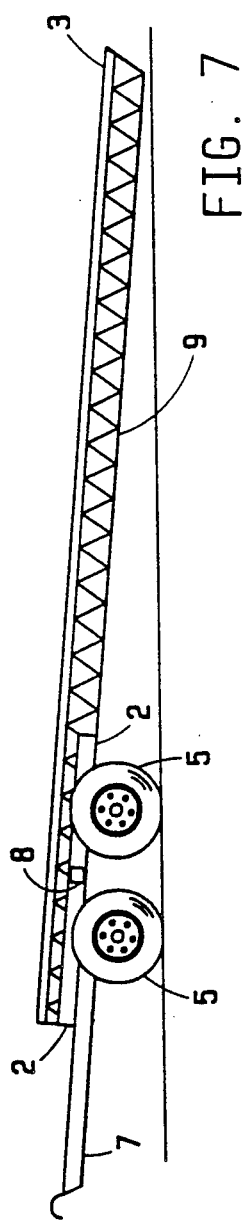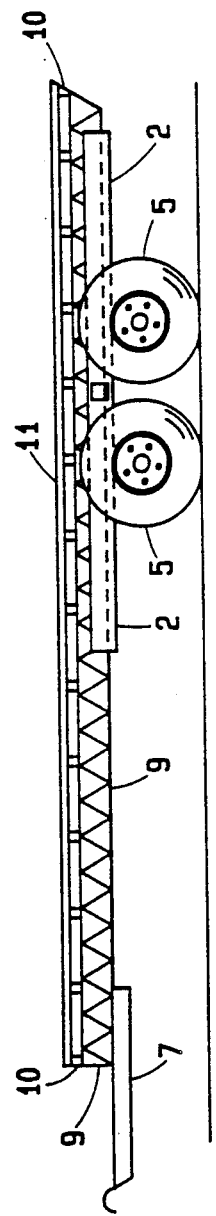

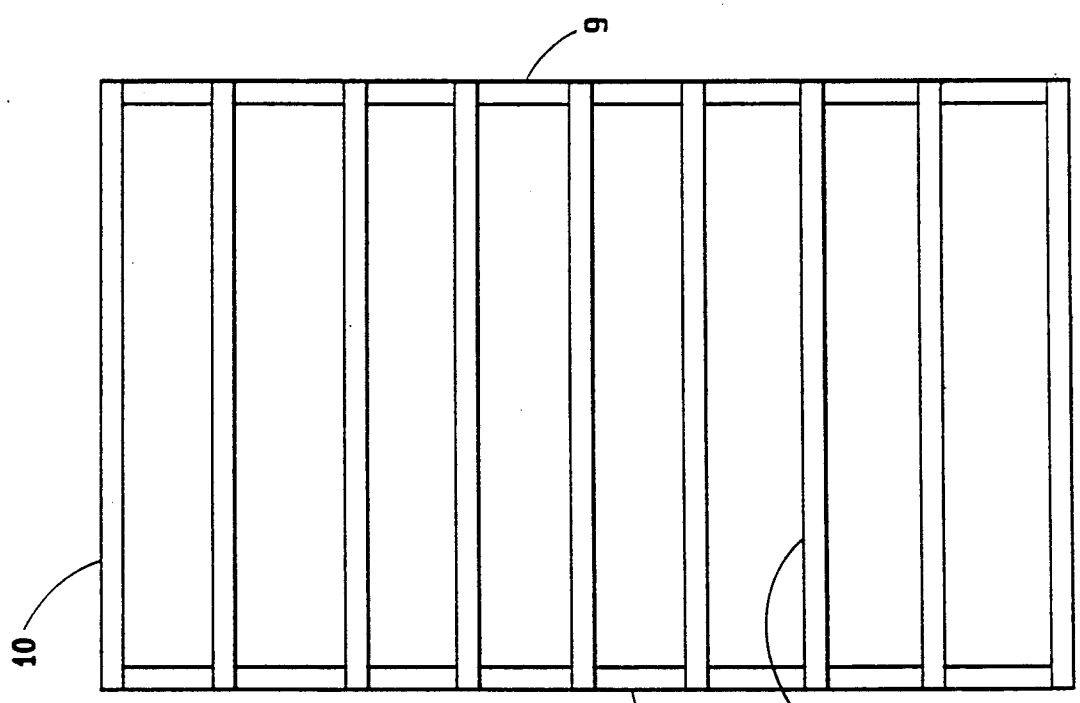
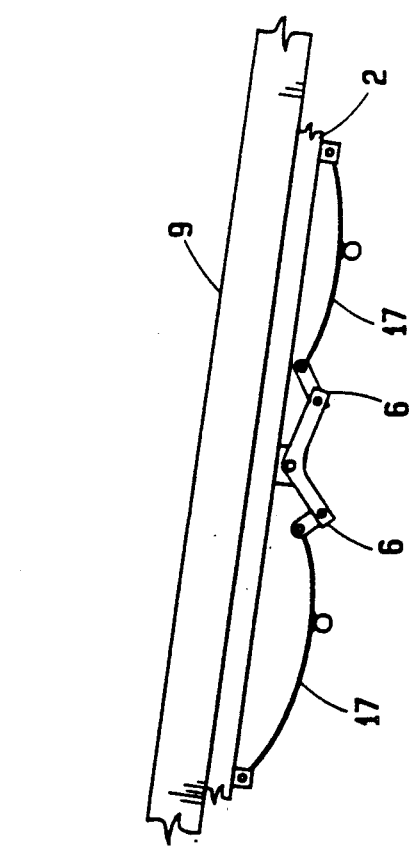
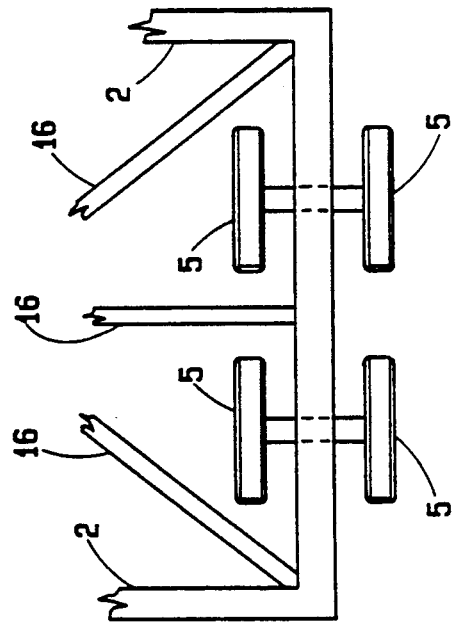
FIG. 11
FIG. 10
FIG. 9

HEAVY DUTY EASY LOADING TRAILER

This application is a continuation of application Ser. No. 07/271,868, filed Nov. 16, 1988 now abandoned.

This invention is a trailer in which the bed slides along the frame to lower the rear of the bed to the ground, thus creating a slant from the ground to the frame. The length of the bed will determine the pitch of the incline. This will allow loading from ground level.

The invention is the short axles, the separate frame, and the sliding bed, that when used in conjunction with the brakes, the locking device, and the spring hangers, will allow the rear of the bed to slide to the ground.

BRIEF DESCRIPTION OF THE DRAWINGS

FIG. 3, is a side view of the trailer in a raised position with the bed sitting between the wheels.

FIG. 4 is a side view of the trailer in a down position, showing the bed between the wheels and the angle of decline.

FIG. 5 is the spring hangers between the dual axles that tilt to make the bed slant.

FIG. 6 is a side view of the wide frame in an up position, showing how the wheel set under the bed.

FIG. 7 is a side view of the wide frame in a down position, showing the wheels under the front of the bed.

FIG. 8 is a view of the spring load lock that holds the bed and frame together.

FIG. 9 is a cross section of the frame, showing the cross bracing.

FIG. 10 is a view of the spring hangers, showing their reaction and tilt when the weight is transferred to the rear of the frame.

FIG. 11 is a top view looking down on the open bed, showing bed trusses or beams and the bed cross braces.

DETAILED DESCRIPTION OF THE INVENTION

Figure 2:
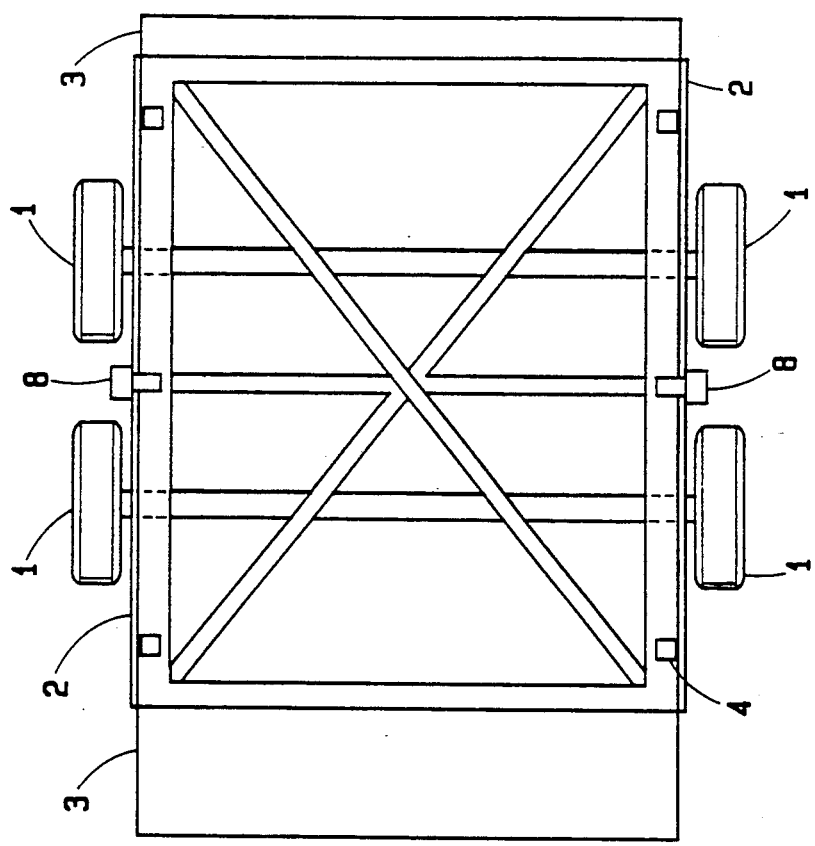
FIG. 2 is a view looking down on the standard axle frame, showing the bed fitting between the wheels. The bed on this frame doesn't sit as high, since it does not cover the wheels.

The trailer is made up of the wheel and axle assembly number 1 and number 5, the frame number 2, the bed number 3 and number 9, the frame rollers number 4, the spring hanger assembly number 6, the tongue and coupling number 7, the bed locks number 8, the bed braces number 10, the bed floor number 11, the bed lock housing number 12, the spring and pin stop for the lock number 13, the locking pin number 14, the spring in the lock number 15, the frame braces number 16, and the spring and axle assembly number 17.

Figure 1:
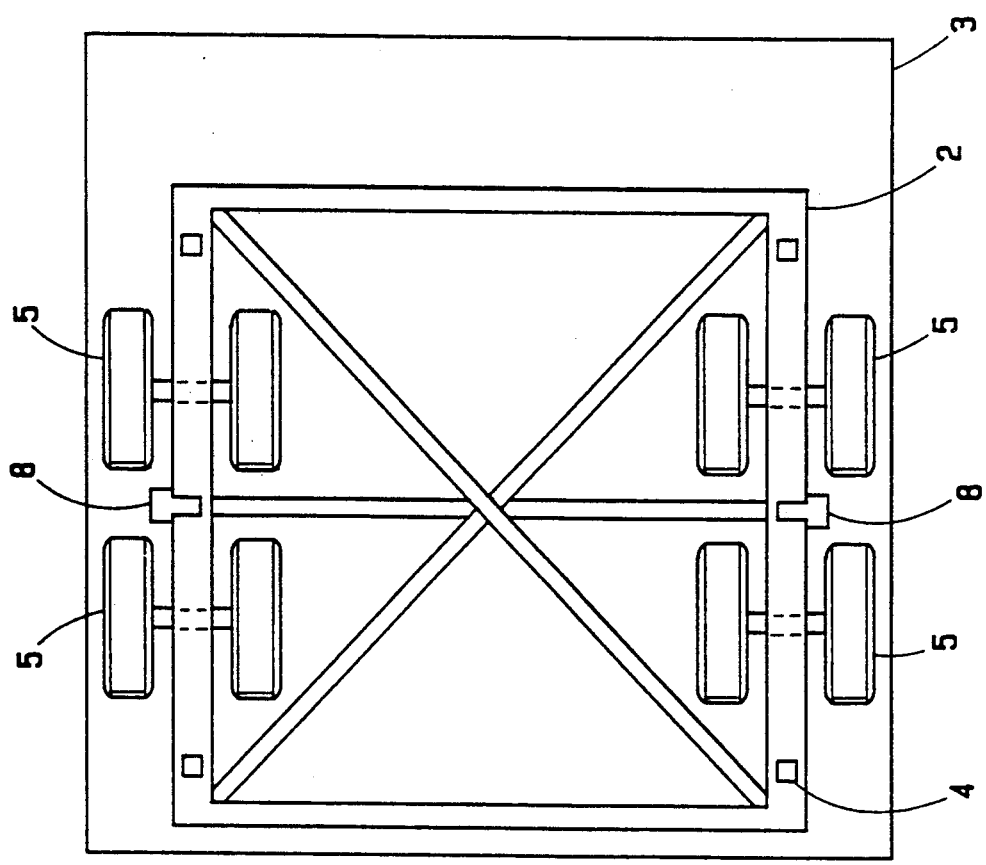
FIG. 1 is a view looking down on the short axle frame, showing how the bed sits over the wheels, allowing a full eight foot wide bed.

To assemble the trailer, the axle and wheel assembly number 1, FIGS. 1, 2, 3, 4, and 9, is attached to the spring assembly number 6, FIGS. 5 and 10, which is attached to the frame number 2, FIGS. 1, 2, 3, 4, 9, and 10. The lock is made up of numbers 12, 13, 14, and 15, FIG. 8, and is fastened to the frame number 2, FIGS. 1, 2 and 4. The sliding bed number 3, FIGS. 3 and 4, sits on the rollers number 4, FIGS. 1 and 2, and is held in place by the locks numbers 12, 13, 14, and 15, FIG. 8. The bed is made up of the bed trusses or beams number 9, FIGS. 3, 4, and 11, the bed braces number 10, FIGS. 3 and 11, and the bed floor number 11, FIG. 3. The tongue and coupling assembly number 7, FIGS. 3 and 4 is fastened to the frame number 2, FIGS. 1 and 2, by the locks numbers 12, 13, 14, and 15, FIG. 8. With reference to FIGS. 6 and 7, to assemble the trailer, the axle and wheel assembly number 1 or number 5, FIGS. 1, 2 and 9, is attached to the spring assembly number 67, FIGS. 5 and 10, which is attached to the frame number 2, FIGS. 1, 2, 6, 7, 9 and 10. The lock is made up of numbers 12, 13, 14, and 15, FIG. 8, and is fastened to the frame number 2, FIGS. 1, 2, 6 and 7. The sliding bed number 3, FIG. 7, sits on the rollers number 4, FIGS. 1 and 2, and is held in place by the locks, numbers 12, 13, 14 and 15, FIG. 8. The bed is made up of the bed trusses or beams number 9, FIGS. 6, 7 and 11, the bed braces number 10, FIGS. 6 and 11, and the bed floor number 11, FIG. 6. The tongue and coupling assembly number 7, FIGS. 6 and 7, is fastened to the frame number 2, FIGS. 1 and 2, by the locks numbers 12, 13, 14, and 15, FIG. 8.

To lower the bed, release the locks, FIG. 8. Hold the trailer brakes and push the bed backwards with the carrier. The trailer wheels and frame number 2, FIGS. 1 and 2, will stand still and the bed, FIG. 11, will roll backwards. The extra rear weight will tilt the spring hangers number 6, FIG. 10, and the frame number 2, FIGS. 1, 2, and 10, letting the bed slant to the ground, FIGS. 4 and 7.

To raise the trailer when loaded, simply repeat the action by moving the carrier forward. The locks will lock the bed into position automatically.

In comparing our invention with other trailers, there is a tilt trailer on the market where the rear end goes down and the front ends goes up, making a steep incline with a sudden fall when the load passes the center point, and falls to level position. With our invention, the rear of the bed goes down, but the front remains constant, making the incline about half of the distance that tilt trailers have.

The trailer is made using two or more axles with single or dual wheels or the short axles shown in the drawing number 5, FIG. 1, whichever is required for the size and use that the individual trailer is designed for. One or more axles may be drop axles. The separate frame is made of metal or other materials with sufficient strength and size to accommodate the size of trailer and recommended loads to be placed there on. The sliding bed and side boards may be of various design.

This invention makes a versatile trailer that can be easily and safely loaded and unloaded at ground level and may be used for hauling any object that the particular trailer is capable of supporting.

I claim:

1. A self-loading trailer, comprising:
    a stationary frame having an upper surface;
    a loading bed having an upper surface that comprises the loading surface and a lower surface that is disposed in a sliding relationship with the upper surface of said stationary frame, said loading bed being longer in one direction than said stationary frame, said loading bed having two positions relative to said stationary frame, a resting position and a loading position, said loading bed in the resting position having the rearmost end moved toward said stationary frame and, in the loading position, having the rearmost end extended outward from said stationary frame;

locking means for locking said loading bed to said stationary frame to prevent sliding relative thereto when said loading bed is in the resting position;

a connecting device being disposed on the forwardmost end of said loading bed for pulling and pushing said loading bed with a vehicle;

first and second wheels on either side of said stationary frame;

suspension means associated with each of said first and second wheels on either side of said frame, each of said suspension means on each side of said frame being in an adjacent relationship with the other and disposed about the rotating axis of said associated first and second wheels on each side of said stationary frame, each of said suspension means supporting said stationary frame at two associated suspension points proximate to the lower surface of said stationary frame on either side of the rotating axis of said associated first and second wheels on either side of said frame and also supporting the rotating axis of said associated first and second wheels on either side of said frame, at least the adjacent ones of the associated suspension points disposed such that one is forward of the other and said adjacent suspension means not overlapping, with the first and second wheels on either side of said frame being compressible with respect to the lower surface of said frame such that when the rearmost end of said loading bed is in the loading position, the weight of said loading bed rearward of said first and second wheels on either side of said frame suspension means causes more compression of the rearmost one of said adjacent suspension points relative to the forwardmost one thereof to allow tilting of said loading bed and said stationary frame; and brakes associated with at least one of said first and second wheels on either side of said frame for preventing rotation thereof when said connecting device has a force associated therewith directed in the rearward direction and said locking means is disengaged to allow said loading bed to be reciprocated backward relative to said stationary frame from the resting position to the loading position and, alternatively, to be moved forward in a sliding relationship from the loading position to the resting position, a rearward directed force causing further compression of the rearmost one of said adjacent suspension points, said rearmost ones of said suspension means operable to further compress in response to rearward forces.

2. The trailer of claim 1 wherein each of said suspension means comprises a an elongated spring that is operable to span the rotating axis of each of said first and second wheels on either side of said frame, one of said leaf springs associated with each of said first and second wheels on either side of each frame, each of said leaf springs having two supporting points disposed away from and on either side of said associated first and second wheels on either side of said frame and the one of said supporting points furthermost from the other of said associated first and second wheels on either side of said frame attached to the lower surface of said stationary frame, the central and lower portion of said leaf spring connected to the central axis of said associated first and second wheels on either side of said frame, the other of said supporting points nearestmost the other of said associated first and second wheels on either side of said frame being compressible relative to the lower surface of said frame such that the rearmost one of said first and second wheels on either side of said frame in the loading position with said brakes applied has the central axis disposed closer to said stationary frame as compared to the forwardmost one of said first and second wheels on the same side of said frame.

3. The trailer of claim 1 wherein said suspension means comprises a an elongated spring associated with each of said first and second wheels on either side of said frame, each of said springs being arcuate in shape with the lower portion thereof connected to the central axis of the associated one of said first and second wheels on either side of said frame and the ends of said leaf spring extending upward, with the one end thereof disposed farthestmost from the other of said first and second wheels on the same side of said frame attached to said stationary frame, and the other of said ends compressibly attached to said stationary frame such that when said loading bed is in the loading position and said brakes are applied, the rearmost one of said springs on either side of said stationary frame are more compressed than the forwardmost ones thereof.

4. A method for lowering the rear portion of a trailer loading bed, comprising the steps of:

providing a stationary frame having a sliding surface on the upper portion thereof;

providing two wheels on either side of said stationary frame, one disposed forward of the other;

providing a suspension device between each of said wheels and said stationary frame that is operable to allow the rearmost one of the wheels on either side of the stationary frame to move closer to the stationary frame relative to the forwardmost one thereof in response to a rearward directed force on the stationary frame;

mounting the trailer bed in a sliding relationship with the stationary frame;

providing a lock between the stationary frame and the loading bed with the loading bed in a resting position wherein the loading bed is positioned forward relative to the stationary frame;

braking the wheels;

disengaging the lock;

forcing the forwardmost end of the loading bed toward the stationary frame with a rearward directed force to place the loading bed in a loading position, with the rearmost end thereof being lower than the forwardmost end as a result of the weight of the rearmost end compressing the suspension device of the rearmost ones of the wheels;

providing a stop between the stationary frame and the loading bed that is contacted when the loading bed is in the loading position to transfer the rearward directed force to the stationary frame and further compress the suspension device associated with the rearmost ones of the wheels; and reversing the procedure wherein the forwardmost end of the loading bed is forced away from the stationary bed to pull the rearmost end toward the stationary frame from the loading position to the resting position.

* * * * *